(12) United States Patent
Möller et al.

(10) Patent No.: US 12,434,793 B1
(45) Date of Patent: Oct. 7, 2025

(54) DEVICE FOR CONNECTING A SHIP TO A LAND-SIDE SUPPLY GRID

(71) Applicant: Stemmann-Technik GmbH, 48465Schüttorf (DE)

(72) Inventors: Christoph Möller, Emsbüren (DE); Pascal Teupen, Rheine (DE)

(73) Assignee: Stemmann-Technik GmbH, Schüttorf (DE)

( * ) Notice: Subject to any disclaimer, the term of this patent is extended or adjusted under 35 U.S.C. 154(b) by 0 days.

(21) Appl. No.: 18/834,472

(22) PCT Filed: Feb. 14, 2023

(86) PCT No.: PCT/DE2023/100123
§ 371 (c)(1),
(2) Date: Jul. 30, 2024

(87) PCT Pub. No.: WO2023/151761
PCT Pub. Date: Aug. 17, 2023

(30) Foreign Application Priority Data

Feb. 14, 2022 (DE) ................ 10 2022 103 342.2

(51) Int. Cl.
*B63B 27/18* (2006.01)
*H02G 11/00* (2006.01)

(52) U.S. Cl.
CPC ............. *B63B 27/18* (2013.01); *H02G 11/00* (2013.01)

(58) Field of Classification Search
CPC ............................... B63B 27/18; H02G 11/00
USPC ..................................................... 174/70 C
See application file for complete search history.

(56) References Cited

U.S. PATENT DOCUMENTS

2019/0367334 A1* 12/2019 Maier ................. B66C 13/12
2021/0155334 A1* 5/2021 Schmidt ................... B63J 3/04

FOREIGN PATENT DOCUMENTS

| CN | 112838552 A | 5/2021 |
|---|---|---|
| DE | 102014213342 A1 | 8/2015 |
| DE | 202017106108 U1 | 11/2017 |
| DE | 102018003806 A1 | 11/2019 |
| EP | 0705665 A1 | 4/1996 |
| WO | WO 2012/116919 A1 | 9/2012 |

OTHER PUBLICATIONS

International Search Report issued on Apr. 26, 2023 by the European Patent Office in International Application PCT/DE2023/100123.

* cited by examiner

*Primary Examiner* — Timothy J Thompson
*Assistant Examiner* — Michael F McAllister
(74) *Attorney, Agent, or Firm* — K&L Gates LLP

(57) ABSTRACT

A device for connecting a ship to a land-side supply grid includes a rail system having a guide channel, a cover designed to cover the guide channel and formed by a plurality of successive articulated cover plates and a land-side coupling unit mounted on the rail system for travel and designed for receiving a cable-connected ship-side plug. The coupling unit includes a lifting device designed to open the cover by opening the cover plates in a position-dependent manner, and a shield to protect an area of the guide channel opened by the lifting device against falling objects. A cable carrier cable-connects the coupling unit to the land-side supply grid. The cable carrier is arranged lying flat on a side in the guide channel and pivotable about a vertical bending axis.

8 Claims, 4 Drawing Sheets

DEVICE FOR CONNECTING A SHIP TO A LAND-SIDE SUPPLY GRID

CROSS-REFERENCES TO RELATED APPLICATIONS

This application is the U.S. National Stage of International Application No. PCT/DE2023/100123, filed Feb. 14, 2023, which designated the United States and has been published as International Publication No. WO 2023/151761 A1 and which claims the priority of German Patent Application, Serial No. 10 2022 103 342.2, filed Feb. 14, 2022, pursuant to 35 U.S.C. 119(a)-(d).

BACKGROUND OF THE INVENTION

The invention relates to a device for connecting a ship to a land-side supply grid.

DE 10 2018 003 806 B4 discloses a device for creating an electrical connection by means of a land-side movable coupling unit having a guide track for a ship-side plug which guide track is semi-circular in cross-section. The rail-mounted movable coupling unit is connected to a land-side supply grid connection via a guidance chain.

In the case of container ships, there is a risk of fastening elements for containers falling onto the quay and causing damage there. An exposed cable carrier is particularly sensitive in this respect. A cable carrier is a component that guides and protects flexible cables. The guide is used to maintain a smallest permissible bending radius of the cables to be protected. Standardized individual elements enable the construction of such a cable carrier according to the modular principle. Cable carriers therefore have deflections that protrude upwards when the cable reverses direction. When there is an impact from above in the area of the deflection, the minimum bending radius of the cables to be protected is undercut and the cables in the energy chain are destroyed. A deflection of a cable carrier can also be unavoidably positioned so unfavorably in front of a bollard that the deflection would collide with mooring lines or is also an obstacle for a gangway that is lowered from the ship's hull.

The invention is therefore based on the object to provide a device for connecting a ship to a land-side supply grid, which device can be arranged in the area of a quay to save as much space as possible, while at the same time enabling better operation safety against falling objects and not presenting an obstacle to other important functional components in the area of the quay or when a ship is moored.

SUMMARY OF THE INVENTION

This object is attained in a device for connecting a ship to a land-side supply grid as set forth hereinafter.

The subclaims relate to useful refinements of the inventive concept.

The device according to the invention for connecting a ship to a land-side supply grid includes a land-side coupling unit for receiving a cable-connected ship-side plug. The land-side coupling unit can be moved along tracks. The land-side coupling unit is cable-connected to the land-side supply grid via at least one cable carrier. According to the invention, provision is made for the at least one cable carrier to have a bending axis in vertical direction in a deflection zone and to be arranged lying flat on its side in a guide channel. The cable carrier therefore does not roll on the subsurface, as is the case with standing arrangements, but rather glides lying over the subsurface. The term "vertical direction" refers to the plumb-line direction at the location, i.e. perpendicular or vertical to the horizontal plane. The "bending axis" is the axis on which the center of curvature of the circle of curvature of the cable carrier or the cables in the deflection zone lies. The energy chain is composed of several chain links connected to each other in pivot axes. The respective pivot axes of the chain links run parallel to each other and parallel to the bending axis. The pivot axes extend from an upper end face to a lower end face of the chain links. The terms "top" and "bottom" refer to the vertical direction/vertical. In the installation position according to the invention, the vertical distance between the end faces determines the height of the energy chain measured in the vertical direction. The terms "lying", "lying flat on the side", "in lying arrangement" mean "lying on one of the two end faces", so that the pivot axes point upwards and downwards, i.e. are arranged vertically and therefore the deflection zone with the likewise vertical bending axis does not protrude upwards in the vertical direction beyond the other end face. The term "bending axis" is not to be confused with the term "bending line", which describes the curved course of the cable carrier or the cable to be guided, i.e. in particular a circle of curvature whose center of curvature lies on the bending axis.

The essentially horizontal or, in particular, horizontal flat arrangement of the cable carrier on one of the end faces in a guide channel makes it possible to design the guide channel to be very flat. Furthermore, the cable carrier no longer protrudes from the guide channel, even in the deflection zone. This has the advantage that the entire device can still be arranged on the quay on the fairway side In front of the bollards. The coupling unit is always moved to the required location where the cable-connected plugs on the ship's side are lowered. In the device according to the invention, there is no upwardly projecting bending region of the cable carrier, which could easily be destroyed by falling objects.

Another advantage is that the deflection zone can neither obstruct mooring lines nor a possibly lowered gangway. The flat construction in lying arrangement within the guide channel requires very little installation space in terms of height and can be integrated into the area of a quay without any major interventions. The guide channel does not even have to be recessed into the surface of the quay, but can be located on and/or next to the quay on the fairway side. Therefore, no structural interventions in the building structure of the quay are required, apart from fastening means for the device according to the invention.

It is considered particularly advantageous when the guide channel is at least partially, but preferably completely, protected by a cover. This can involve a cover of an elastic material, like, e.g., of a thick-walled rubber or plastic mat. However, it may also involve individual rigid elements, like, e.g., individual cover plates. In any case, the cover must be designed in such a way that the coupling unit has access to the cable carrier as an engagement connection of the cable carrier. The coupling unit preferably has a lifting device for opening the cover. The cover is opened by the coupling unit when the coupling unit is moved. The cover is closed again after it has been moved passed by. This is implemented automatically by restoring forces of the cover. In the case of laterally articulated cover plates, gravity is sufficient as a restoring force. The energy-carrying cables are very well protected by the cover against mechanical influences and also against the effects of the weather. Falling parts can therefore neither affect the cables nor the function of the cable carrier. Snow and ice remain on the cover.

The cover plates involve in particular articulated cover plates made of sheet metal, especially sheet steel, which are set up and designed to be opened by the lifting device depending on their position. Due to their own weight, there is no need for a separate closing device or lowering device for the cover plates. The cover plates also only need to be raised far enough for the engagement connection and the connecting cables to be able to be guided on the coupling unit through a gap underneath the cover plates, so that the cable carrier is moved in accordance with the travel direction of the coupling unit. The cover plates can have a textured surface to increase slip resistance and therefore work safety.

In a particularly preferred embodiment of the invention, the guide channel is set up and designed to be arranged on the fairway side of a quay. The fairway is adjacent to a quay wall of the quay. The guide channel can therefore be arranged in the area of the quay wall. It can project beyond the quay wall towards the fairway or be completely attached to the quay wall above the fairway. For this purpose, a support structure pointing towards the fairway can be mounted on the quay wall, forming a horizontal topside that protrudes above the quay surface. The horizontal topside of the support structure is preferably at essentially the same height as the surface of the quay, but in any case above the usual water level of the fairway. The guide channel can in turn be arranged on this support structure. In this embodiment, the guide channel is located virtually on the fairway side in front of the quay and not on the quay. The device is firmly connected to the structure of the quay.

The coupling unit is preferably arranged above the guide channel. The device according to the invention therefore does not require any installation space above the quay or above the quay wall, but only along the quay and in front of the quay. The device can be retrofitted to existing structures comparatively easily. In addition, the device is very easily scalable in terms of the length of the travel path.

The coupling unit moves very close to the hull of the ship to be supplied with power. The device according to the invention is protected from damage, in particular from ships docking or casting off, by means of spacer elements on the quay wall and by using fenders that are already present on the quay.

The device according to the invention has no deflection zone of the cable carrier that could collide with mooring lines which have to be fixed to bollards on the quay wall. As described above, the device according to the invention also does not interfere with the positioning of the ship in relation to the gangway because the deflection zone of the cable carrier is arranged flat in the guide channel. The exposed position of the device in relation to the quay, so long as it is attached in front of the quay wall, is not critical with regard to the cable carrier and with regard to the reliable energy supply, because the robust cover plates reliably protect the cable carrier.

The rail-mounted coupling unit is connected to the at least one rail in such a way that it not only rests on it from above, but is also secured against lifting. The coupling unit engages at least partially under the rail. The coupling unit cannot derail during normal use, not even under adverse weather conditions such as wind or storm surges. Furthermore, the guide channel can be drained very easily due to its arrangement in front of the quay wall, a fact that also contributes to the operation safety of the device according to the invention.

It should also be mentioned that the cover of the guide channel does not present any tripping hazards in the area of the quay wall from a work safety point of view. The cover is stress-resistant, load-bearing and configured to support the movable coupling unit.

The coupling unit itself can fulfill a further protective function with regard to the guide channel. It can have a shield or represent a shield by itself in order to protect an area of the guide channel, opened by the lifting device, against falling objects. The connection between the coupling unit and the cable carrier, the so-called engagement connection, is preferably located below the coupling unit, so that the guide channel only has to be opened by the lifting device below the coupling unit. As the coupling unit itself is located above the open area of the guide channel, the open area of the guide channel is also protected against falling objects. The open area preferably points hereby away from the fairway and points towards the land side. For this purpose, the cover plates are preferably attached on the fairway side via at least one joint. Each of the cover plates therefore has an end connected via a joint and a free, pivoting end. The free end points to the land side and can be raised by means of the lifting device.

The arrangement of the joint towards the fairway side makes it easier to carry out any inspections or repairs in the area of the guide channel. The opened-up cover plates also protect the installation personnel towards the fairway side and virtually serve as fall protection. If a single cover plate becomes damaged, it can easily be replaced.

The guide channel can also have at least one rail for the coupling unit. In this context, the guide channel is the central load-bearing element of the device according to the invention. Preferably, the guide channel has two parallel rails for the coupling unit. The track width of the chassis of the land-side coupling unit preferably corresponds essentially to the outer width of the guide channel. The rails can form the side walls of the guide channel. U-shaped profiles in cross-section of the rails, which have legs pointing in opposite directions and away from the guide channel and a web connecting the legs, enable a particularly compact design. The vertical web limits the guide channel. The two lower legs form the running surfaces for the coupling unit. The upper legs serve as supports for the cover plates. The rails therefore have a dual function as components of the guide channel and for guiding the coupling unit.

In particular, the guide channel accommodates not just one but two cable carriers which extend from the infeed point in opposite directions. The number of cable carriers required depends on the power to be transmitted by the electrical cables. Cables with greater cross-sections require greater bending radii. If the bending radii are to remain small, e.g. because the maximum possible width of the guide channel in front of the quay wall is limited, several cable carriers extending even in opposite directions can be used. The invention does not preclude the provision of two or more cable carriers extending in the same direction, with an inner cable carrier having a smaller bending radius than a larger cable carrier. According to the invention, the cable carrier is not limited to transmitting of only electrical energy. The cable carrier can also be used to transmit other media or information, for example via fluid lines or signal lines.

The lying arrangement of the cable carrier according to the invention does not roll during displacement, but slides. In order to reduce the sliding friction, provision is made for arrangement of sliding elements on the cable carrier and/or on the guide channel between the sliding underside or bottom end face and the guide channel. The sliding elements can be made of a plastic with a low coefficient of friction.

As an alternative, a rolling bearing of the cable carrier is provided within the guide channel. Rollers or balls can be arranged between the underside or bottom end face of the cable carrier and the support surface in the guideway.

BRIEF DESCRIPTION OF THE DRAWING

The invention is explained in more detail hereinafter with reference to exemplary embodiments shown purely schematically in the drawings. It is shown in.

DETAILED DESCRIPTION OF PREFERRED EMBODIMENTS

Figure 1:
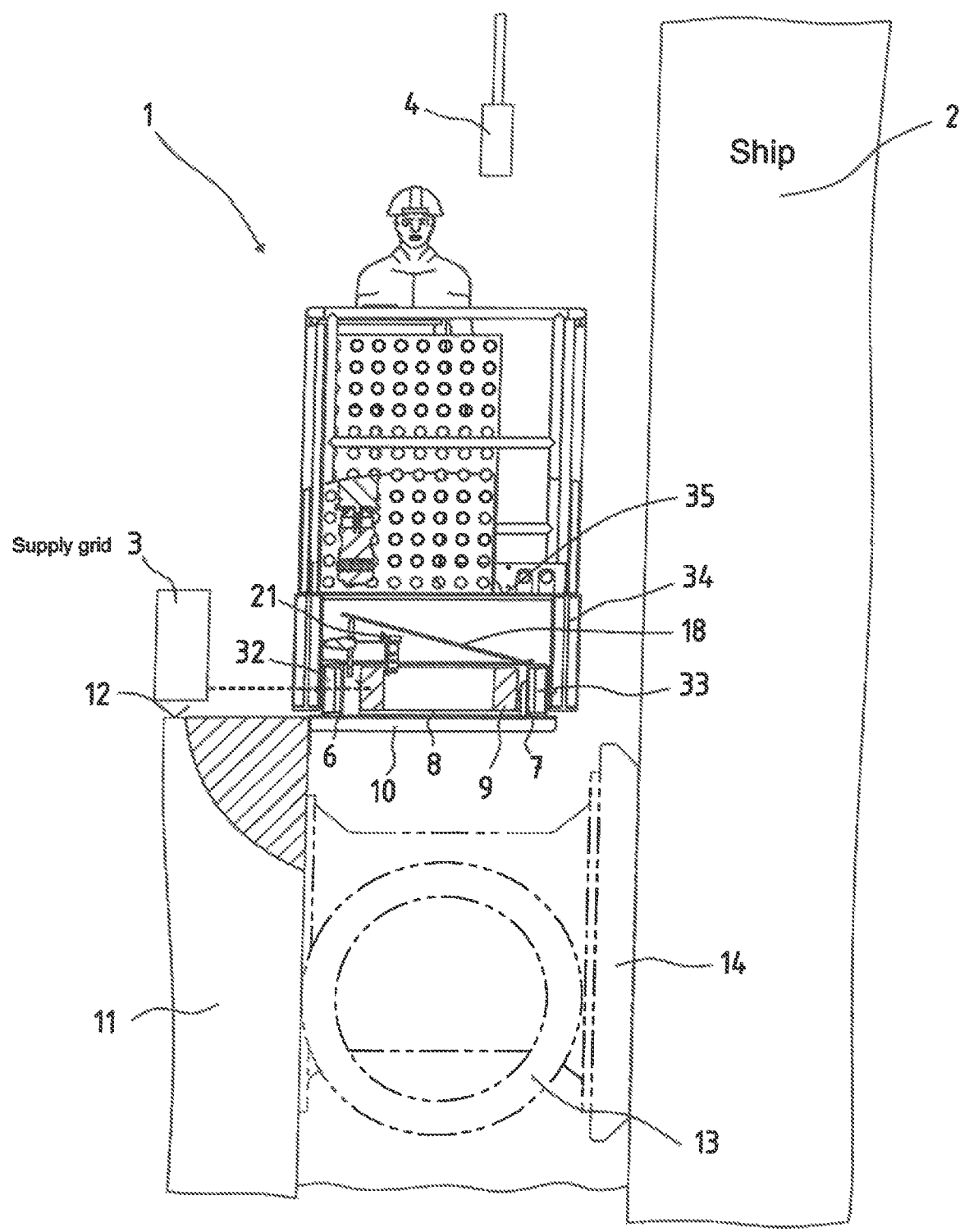
FIG. 1 a sectional view of the device according to the invention.
Figure 2:
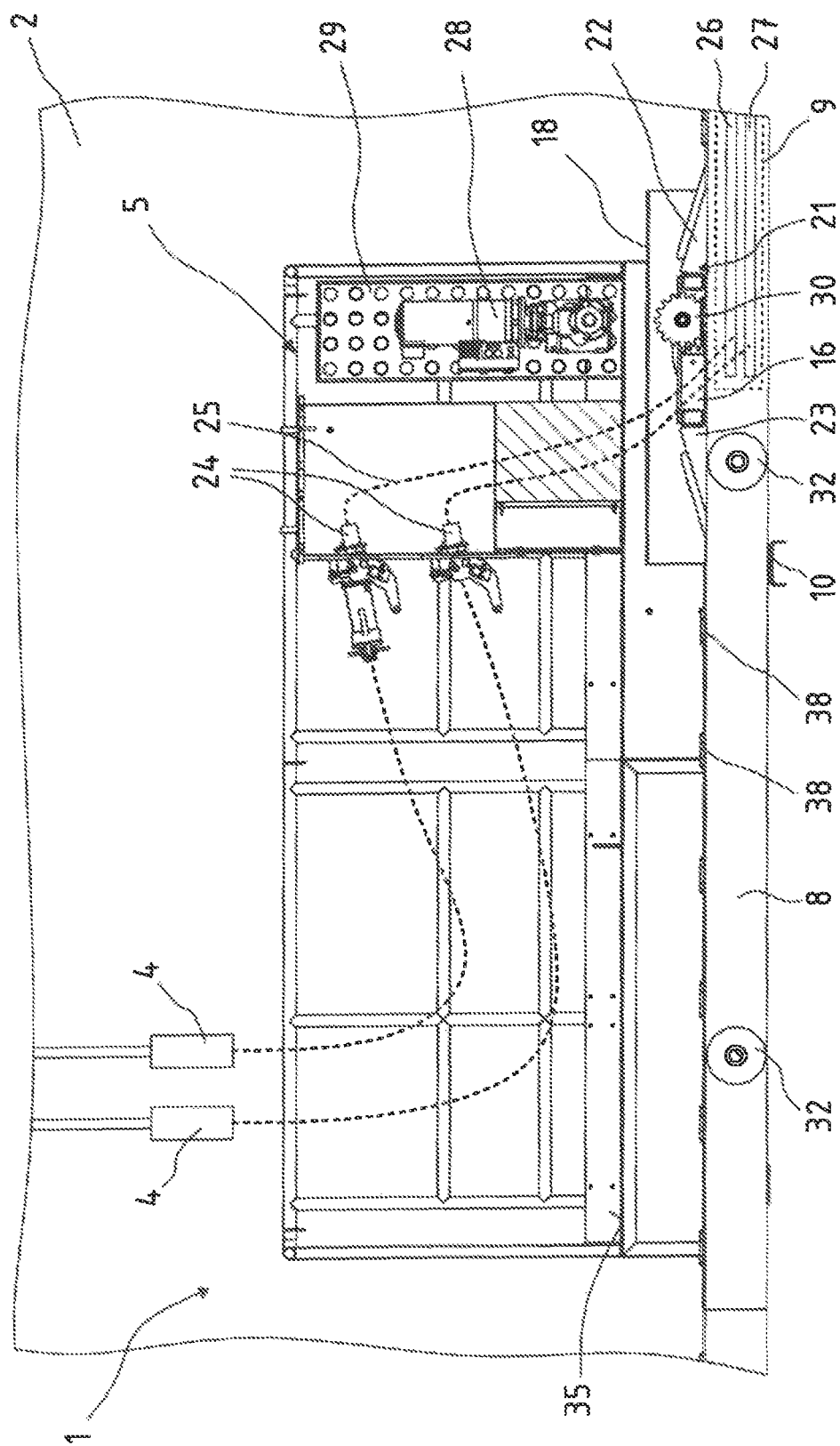
FIG. 2: a partial sectional side view of the device of FIG. 1.

FIG. 1 shows a device 1 for connecting an electrical grid of a ship 2, not shown in detail, to a land-side supply grid 3. For this purpose, a cable-connected ship-side plug 4 is lowered from the ship 2 and fed to the device 1 from above. The device 1 is located vertically below the plug 4 and includes a coupling unit 5, as shown in FIG. 2. The coupling unit 5 is rail-mounted for travel. As stationary component, the device 1 includes rails 6, 7 with a guide channel 8 for receiving a cable carrier 9. The rails 6, 7, the guide channel 8 with the cable carrier 9 and the entire device 1 on the rails 6, 7 are supported by horizontal supports 10. These supports 10 are arranged on a quay 11 on the fairway side. The device 1 according to the Invention is thus partly located on the fairway side in front of the quay 11, but also above the bottom level 12 of the quay 11. FIG. 1 shows a purely schematic representation of fenders 13 and spacer elements 14, which are arranged below the device 1 and above the indicated water level. The device 1 is dimensioned in such a way that a ship 2 docking or casting off cannot collide with the components of the device 1. The device 1 can be retrofitted in existing Industrial or ferry ports.

Figure 4:
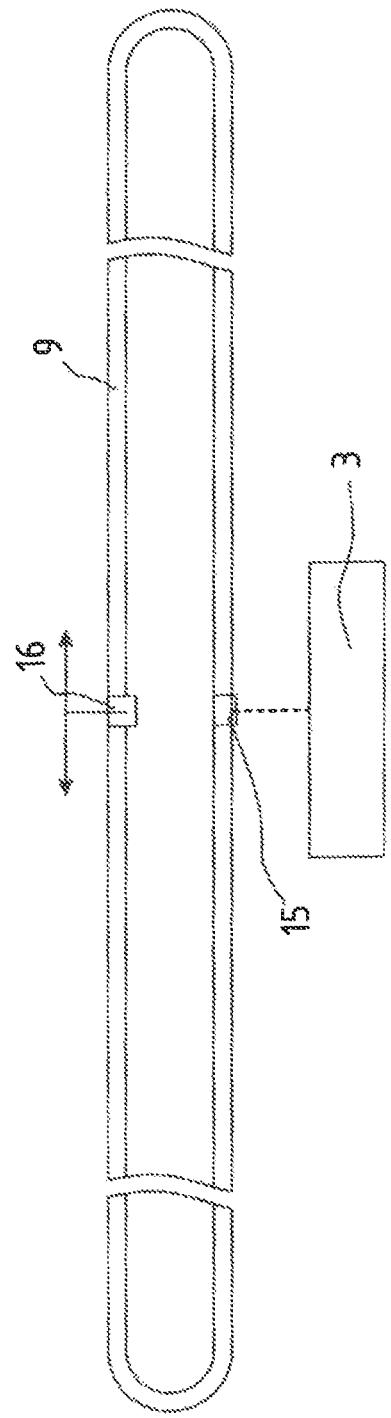
FIG. 4 a principle representation of the counter-rotating cable carrier of the device according to the Invention.

A particular feature of the invention is the arrangement of the cable carrier 9 within the guide channel 8. The cable carrier 9 is arranged flat on the side. FIG. 4 shows a purely schematic plan view of the cable carrier 9. The cable carrier 9 is connected to the land-side supply grid 3 via a fixed feed point 15. The double arrow in FIG. 4 illustrates that the extraction point 16 can be shifted in both directions of the arrow, for example by 50 to 200 m in each direction, so that a range of 100 to 400 m can be bridged. The system is scalable by adjusting the length of the cable carrier 9.

The cable carrier 9 is counter-rotating, i.e. there is a left and a right cable carrier strand. The deflection zones at the ends move in the same direction when the extraction point is displaced. In this context, counter-rotating means that the cable carrier strands are connected to the extraction point 16 from opposite sides. The opposing cable carriers 9 make it possible to use cables with smaller cross-sections and smaller bending radii and still transmit correspondingly great amounts of energy via the available cross-sections. In this way, the guide channel 8 can have a smaller width and thus be so narrow that it can be mounted in front of the quay 11.

It is particularly advantageous that the guide channel 8 is built very flat and is able to fully accommodate and support the cable carrier 9. For this purpose, the guide channel 8 has a cover 17, which is formed by several individual articulated cover plates 18, 19, 20. Cover plates 18, 19, 20 are set up and designed to be lifted by a lifting device 21 (FIG. 2), when the coupling unit 5 with the extraction point 16 is guided past the respective cover plate 18, 19, 20. FIG. 2 shows the lifting device 21 with ramp sections 22, 23 at the ends, which grip under the respective cover plate 18, 19, 20 when the coupling unit 5 is moved in order to lift it so that the coupling unit 5 can be displaced over its extraction point 16 along the otherwise closed guide channel 8. FIG. 2 shows a schematic representation of how two cable-connected ship-side plugs 4 can be lowered and manually connected to corresponding plug-in couplings 24 on the coupling unit 5. The dashed lines make it clear that the plug-in couplings 24 are connected via cables 25 to energy-conducting cables 26, 27 of the cable carrier 9.

Figure 3:
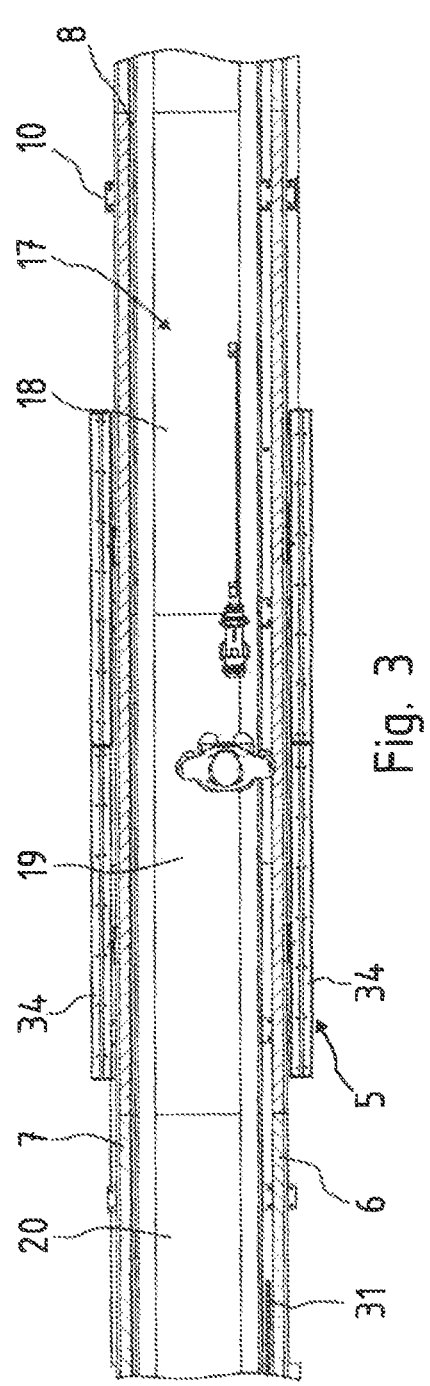
FIG. 3 a partial sectional plan view of the device of FIG. 1.

The side view of FIG. 2 further shows an electromechanical drive unit 28 arranged in a housing 29 on the movable coupling unit 5. The drive unit 28 is used in a manner not shown in detail to drive a drive wheel 30, which in this exemplary embodiment is in the form of a gear wheel and in engagement with a toothed rack 31, which is shown schematically in FIG. 3. The toothed rack 31 runs parallel to the rails 6, 7. The coupling unit 5 is moved into the desired position by means of the controllable drive unit 28.

The rails 6, 7 are configured in a U-shape. Running wheels 32, 33, which are attached to a chassis 34, are arranged in the U-shaped area of the rails 6, 7. The chassis 34 is dimensioned in such a way that the opened cover plates 18, 19, 20 are located below a working platform 35 in the open state, on which an operator can receive the plugs 4 and guide them to the respective plug-in coupling 24. The working platform 35 extends at least partially over the opened area of the guide channel 8 and thus provides additional shielding against falling objects.

Figure 5:
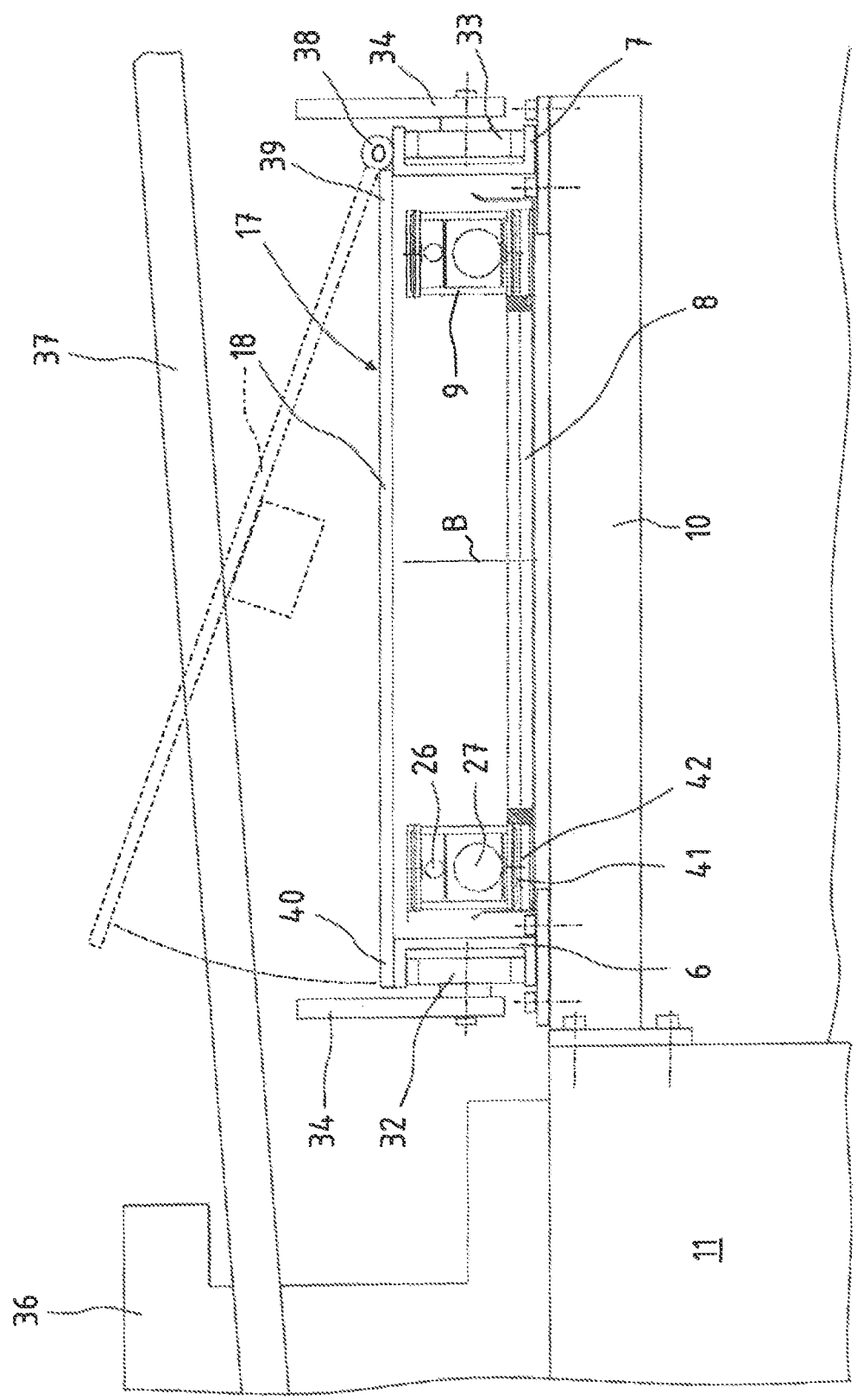
FIG. 5 a cross-sectional illustration of a further exemplary embodiment of the device according to the invention.

The chassis 34 with the running wheels 32, 33 is shown once again in a greatly simplified representation in FIG. 5. FIG. 5 shows a bollard 36 with a mooring line 37 on the quay 11. The cover 17 with the cover plate 18 is so low when closed that it does not collide with the mooring line 37. The structural height of the closed guide channel 8 is also so low because the rails 6, 7 arranged at the edges laterally delimit the guide channel 8 and at the same time serve as a stop for the cover plate 18 or the entire cover 17. In the exemplary embodiment in FIG. 5, it can be seen that the cover 17 or the cover plate 18 opens towards the land side. On the fairway side, a joint 38 is attached to the topside of the rail 7. Each of the cover plates 18, 19, 20 can be connected to the rail 7 via one or more joints 38. Preferably, two joints 38 (FIG. 2) are provided for each cover plate 18, 19, 20.

The sectional view of FIG. 5 also illustrates in cross-section of the cable carrier 9 that two cables 26, 27 can be arranged in different height regions and with different cross-sections within the cable carrier 9. FIG. 5 thus illustrates by way of example that cables for different purposes can also be routed in one and the same cable carrier 9, for example a cable 27 with greater cross-section for energy transmission in combination with a cable 26 with smaller cross-section for data transmission.

In the closed position, the ends 39 connected via the joint 38 and the free, pivoting ends 40 of the cover plates 18 are in a flat horizontal plane. The raised position is illustrated with a broken line and only occurs where the coupling unit 5 requires it. No mooring lines 37 are there.

The cover plates 18, 19, 20 are preferably made of a metallic material that offers sufficient protection against heavy objects falling down, like for example fastening elements of containers that can fall from a great height. The guide channel 8 therefore has a considerable protective function for the cable carrier 9 and the cables 26, 27 located in it. Should individual areas, in particular cover plates 18, 19, 20, become damaged, they can easily be replaced from the land side. Maintenance of the cable carrier 9 is also possible at any time easily and quickly by opening the cover plates 18, 19, 20.

To reduce wear on the cable carrier 9 lying on its side, a suitable sliding element 42 with a low coefficient of friction can be arranged between an underside 41 of the cable carrier 9 and the guide channel 8, for example sliding elements made of plastic. Friction-reducing lubricants may also be used.

The particular advantage of the device 1 according to the invention is that the guide channel 8 can remain completely closed also in the deflection zone of the cable carrier 9. Except in the area of the coupling unit 5, which is required anyway, there are no areas that protrude vertically above the height of the guide channel 8. Regardless of the position of the coupling unit 5, which is never in the area of a gangway because the plugs 4 are always lowered at a distance from the gangway, there can be no areas that could hinder the mooring or handling of the ship during loading and unloading. No mooring lines 37 are interfered with because the device 1 according to the invention, i.e. the guide channel 8, does not protrude upwards beyond the bollards 36 for mooring. The device 1 according to the invention provides additional work safety because the space between the waterside wall of the quay 11 and the hull of the ship 2 is bridged.

FIG. 5 also shows a bending axis B pointing upwards, i.e. in vertical direction, about which the cable carrier 9 arranged in the guide channel 8 on its side can be pivoted in the deflection zone. The underside 41 of the cable carrier 9 is formed by the end faces of the individual chain links of the cable carrier 9. The individual chain links are pivotably connected to each other via the end faces. The respective pivot axes of the chain links in the connection zone of the end faces run parallel to the bending axis B, i.e. also in the vertical direction in the illustration in FIG. 5.

What is claimed is:

1. A device for connecting a ship to a land-side supply grid, the device comprising:
    a rail system having a guide channel;
    a cover designed to cover the guide channel, said cover being formed by a plurality of successive articulated cover plates;
    a land-side coupling unit mounted on the rail system for travel and designed for receiving a cable-connected ship-side plug, said coupling unit including a lifting device designed to open the cover by opening the cover plates in a position-dependent manner, and a shield designed to protect an area of the guide channel opened by the lifting device against falling objects; and
    a cable carrier designed to cable-connect the coupling unit to the land-side supply grid, said cable carrier arranged lying flat on a side in the guide channel and pivotable about a vertical bending axis.

2. The device of claim 1, wherein the guide channel is designed to be arranged on a fairway side on a quay, said coupling unit being arranged above the guide channel.

3. The device of claim 1, wherein the cover plates each have one end pointing towards a land side and another free, pivotable end arranged on a fairway side, the device further comprising joints for connecting the one ends of the cover plates to the rail system, wherein the free, pivotable ends of the cover plates are liftable by the lifting device.

4. The device of claim 1, wherein the rail system includes at least one rail for the coupling unit.

5. The device of claim 1, wherein the rail system includes parallel rails for the coupling unit.

6. The device of claim 1, further comprising two of said cable carrier for connection of the coupling unit, said two cable carriers extending in opposite directions.

7. The device of claim 1, further comprising sliding elements arranged between an underside of the cable carrier and the guide channel.

8. The device of claim 1, further comprising a rolling bearing designed to support the cable carrier in the guide channel.

* * * * *